United States Patent
Salmi et al.

(10) Patent No.: US 8,448,507 B2
(45) Date of Patent: May 28, 2013

(54) METHOD AND DEVICE FOR DETECTING HYDROMETEORS

(75) Inventors: Atte Salmi, Porvoo (FI); Lasse Elomaa, Helsinki (FI)

(73) Assignee: Vaisala Oyj, Helsinki (FI)

( * ) Notice: Subject to any disclaimer, the term of this patent is extended or adjusted under 35 U.S.C. 154(b) by 57 days.

(21) Appl. No.: 13/265,238

(22) PCT Filed: Apr. 20, 2010

(86) PCT No.: PCT/FI2010/050319
§ 371 (c)(1), (2), (4) Date: Oct. 19, 2011

(87) PCT Pub. No.: WO2010/122223
PCT Pub. Date: Oct. 28, 2010

(65) Prior Publication Data
US 2012/0031181 A1 Feb. 9, 2012

(30) Foreign Application Priority Data

Apr. 22, 2009 (FI) .................................... 20095444

(51) Int. Cl.
*G01W 1/14* (2006.01)
*G01W 1/00* (2006.01)

(52) U.S. Cl.
CPC ............. *G01W 1/00* (2013.01); *G01W 2203/00* (2013.01)
USPC .................................... 73/170.16; 73/170.17

(58) Field of Classification Search
None
See application file for complete search history.

(56) References Cited

U.S. PATENT DOCUMENTS

| | | | |
|---|---|---|---|
| 5,343,744 A | 9/1994 | Ammann | |
| 5,528,224 A | 6/1996 | Wang | |
| 5,880,836 A | 3/1999 | Lönnqvist | |
| 6,128,578 A * | 10/2000 | Sakaino et al. | 702/3 |
| 7,249,502 B2 * | 7/2007 | Luukkala et al. | 73/170.17 |
| 7,286,935 B2 | 10/2007 | Aspola et al. | |
| 2003/0025628 A1 | 2/2003 | Katsuhiro | |
| 2005/0174720 A1 * | 8/2005 | Luukkala et al. | 361/600 |
| 2007/0103359 A1 | 5/2007 | Testud | |
| 2007/0132599 A1 * | 6/2007 | DuFaux et al. | 340/601 |
| 2007/0157721 A1 * | 7/2007 | Veerasamy | 73/170.17 |
| 2010/0169017 A1 * | 7/2010 | Dufaux et al. | 702/3 |
| 2012/0013503 A1 * | 1/2012 | Heilmann et al. | 342/26 R |
| 2012/0158207 A1 * | 6/2012 | MacNeille et al. | 701/1 |

FOREIGN PATENT DOCUMENTS

| | | |
|---|---|---|
| DE | 44 34 432 A1 | 3/1996 |
| EP | 0 422 553 A1 | 4/1991 |
| WO | WO 2005116610 A1 * | 12/2005 |

OTHER PUBLICATIONS

G. Foote et al., "Terminal velocity of raindrops aloft" *Journal of Applied Meteorology* 1969, vol. 8, pp. 249-253, ISSN 0894-8763.
S. Shimizu at al., "Development for a radar data assimilation procedure using specific differential phase" Proceedings of ERAD 2008—The fifth European Conference on Radar in Meteorology and Hydrology.

* cited by examiner

*Primary Examiner* — Andre Allen
(74) *Attorney, Agent, or Firm* — Muncy, Geissler, Olds & Lowe, PLLC

(57) ABSTRACT

A method and apparatus in connection with a hydrometeor measuring device. According to the method, the amount of precipitation is determined with the aid of the number and size of the hydrometeors. The determining of the size of the hydrometeors is altered as a function of the prevailing atmospheric pressure, in such a way that, the higher the atmospheric pressure, the larger a hydrometeor with the same speed will be estimated to be.

9 Claims, 6 Drawing Sheets

METHOD AND DEVICE FOR DETECTING HYDROMETEORS

The present invention relates to a method in connection with a measuring device detecting hydrometeors.

The invention also relates to a measuring device detecting hydrometeors.

The method, to which the invention relates, concerns sensors measuring precipitation in its various forms (particularly water, snow, and hail), which are based on detecting the mechanical impulses created when hydrometeors strike a detector surface, or correspondingly to the remote detection of hydrometeors. In remote-detection devices, precipitation is estimated optically, acoustically, or with the aid of radio and/or microwaves. In these, a wave motion is directed to the precipitation and the parameters measuring the precipitation are defined on the basis of the reflected, damped, or scattered wave motion.

The information produced by the sensor can be the amount of precipitation, the intensity of the precipitation, type of the precipitation, the drop-size distribution, the kinetic energy of the precipitation, or some other variable that can be computed from the impulses created by the hydrometeors.

A sensor and a method immediately detecting hydrometeors striking a detector surface is disclosed, for example, in the applicant's earlier U.S. Pat. Nos. 7,249,502 and 7,286,935. A precipitation sensor operating on a corresponding principle is also disclosed in EP patent 0 422 553 B1 and in German patent application DE 44 34 432 A1. Optical measurement methods are disclosed in, for instance, the applicant's own U.S. Pat. No. 5,880,836.

Though the apparatuses according to the prior art give relatively good measurement results, inaccuracies have been detected in them both during changes in weather and when devices are placed at different altitudes above sea level. Variation in the altitude of a measuring device has surprisingly caused errors in various measurement parameters.

The invention is intended to eliminate the defects of the state of the art described above and for this purpose create an entirely new type of method and apparatus in connection with a sensor detecting hydrometeors.

The invention is based on taking into account not only a normal measurement based on the impulses of hydrometeors or optical detection, but also the altitude of the measuring device above sea level, on the principle that the higher the measurement takes place, the smaller a hydrometeor with the same velocity will be estimated to be. According to a preferred embodiment of the invention, the atmospheric pressure is measured at least substantially simultaneously with the precipitation measurement and, when the pressure decreases, a hydrometeor with the same velocity is estimated to be smaller than at atmospheric pressure at sea level.

More specifically, the method according to the invention is characterized in that the determining of the size of the hydrometeors is changed as a function of a prevailing atmospheric pressure, in such a way that the higher the atmospheric pressure, the larger a hydrometeor with the same speed will be estimated to be.

For its part, the apparatus according to the invention is characterized in that the device comprises means for altering the determining of the size of the hydrometeors as a function of a prevailing atmospheric pressure, in such a way that the higher the atmospheric pressure, the larger a hydrometeor with the same speed will be estimated to be.

Considerable advantages are gained with the aid of the invention.

With the aid of the invention, measurement accuracy can be further improved. In the best case, the measurement accuracy can also be improved when the atmospheric pressure changes at the level of the sea surface.

With the aid of the invention, the measurement accuracy particularly of measurement devices located in mountainous areas improves significantly. According to one preferred embodiment of the invention, pressure measurement can be permanently integrated in the measurement device, in which case, with the aid of a suitable algorithm the measurement device will make accurate measurements, irrespective of the altitude of its location.

In the following, the invention is examined with the aid of examples and with reference to the accompanying drawings.

FIG. 2b shows a cross-sectional top view of the solution according to FIG. 2a.

The following terms will be used in the description of the context of the invention:

Amount Or Accumulation of Precipitation:

The vertical depth on a flat surface of the amount of water precipitated. The standard unit, mm.

Intensity of Precipitation:

The accumulation of precipitation per unit of time. Standard unit, mm/h.

Drop-size Distribution:

The number of drops of each size in a volume unit of air.

When the accumulation of precipitation is measured, what is measured is thus the total volume of the detected drops per surface-area unit.

In the measurement of the kinetic energy of precipitation according to the prior art, referred to above, the kinetic energies of the individual precipitation drops are summed $E=\frac{1}{2} m v^2$.

Figure 1:
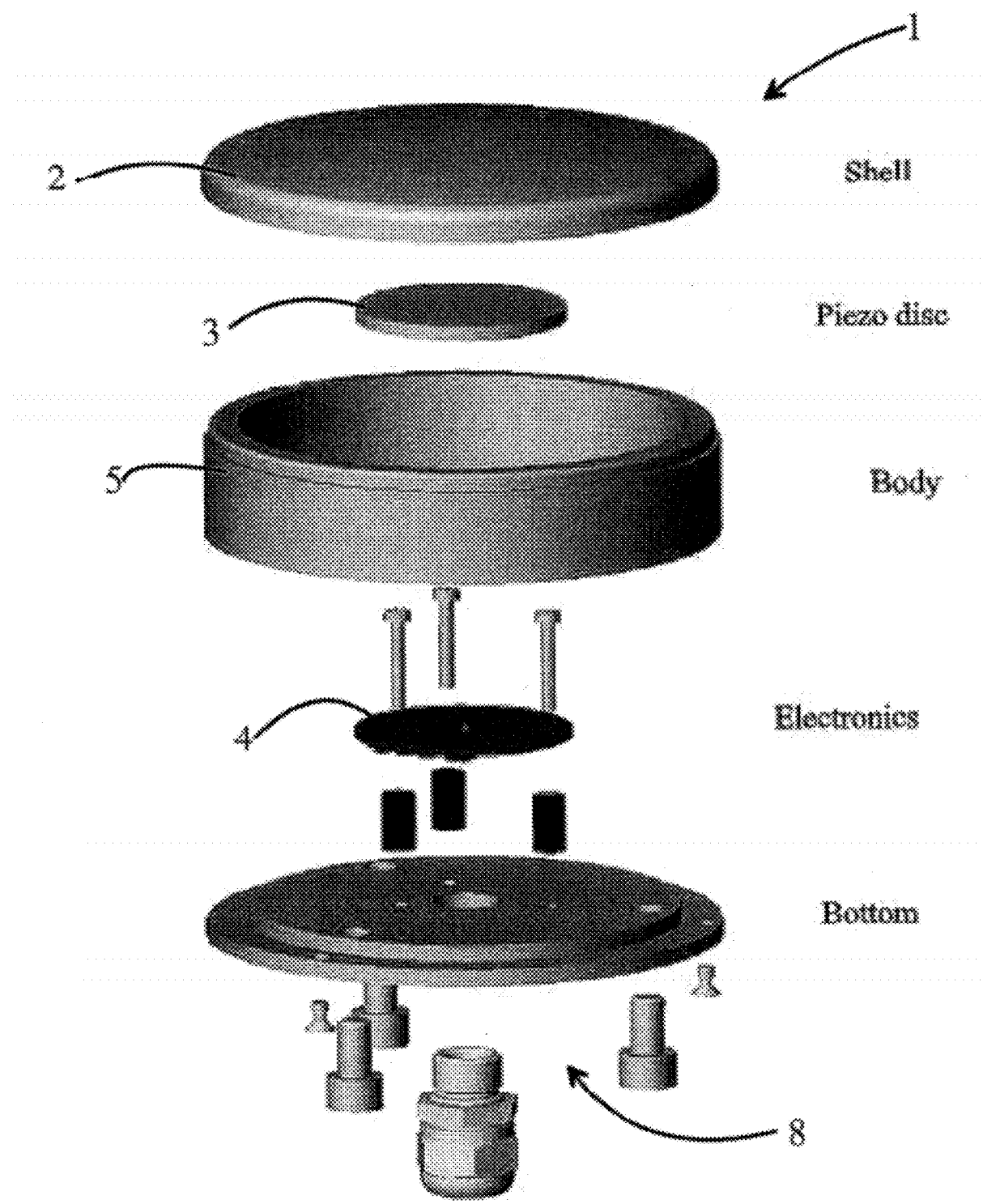
FIG. 1 shows an 'exploded view' of one sensor according to the prior art.

According to FIG. 1, the sensor 1 consists of a detector surface 2, which the hydrometeors, such as rainwater drops and/or hailstones strike, a detector 3, by means of which the pulses caused by the drops striking the surface 2 are detected, and measuring electronics 4 and computation algorithms, with the aid of which the intensity of the precipitation (mm/h) and the cumulative amount of precipitation (mm) are calculated.

The detector surface 2, which is thus the surface receiving precipitation, is rigid and attached to a device body 5. The attachment can be entirely rigid, or implemented with the aid of an O-ring or similar flexible attachment piece. The detector 3 is typically permanently attached to the detector surface 2. Computation takes place by utilizing data on the number of registered pulses, and/or on some feature dependent on the pulse, such as the amplitude or full width at half maximum, or a combination of these.

The detector surface 2 is planar, discoid, or domed (spherical surface) and shaped in such a way that water does not collect on its surface. In order to facilitate the attachment of the detector 3, its attachment point on the detector surface 2 can be planar. The larger the surface area of the detector, the more drops will strike it, and the smaller the statistical error in the computed precipitation amount will be. On the other hand, when the surface area increases, an increasing number of impacts occur, the pulses of which overlap, which interferes with the interpretation of the results. In practice, a suitable detector size has been shown to be 20-150 cm². The detector can also consist of several parts, each of which is connected to its own detector.

The detector 3 measures the deformation of the detector surface caused by the drops. The following, among others, can be used as the detector 3:
- a force or acceleration sensor attached to the detector surface,
- a pressure-sensitive membrane on the detector surface, such as a piezoelectric PVDF plastic film, or a ceramic piezoelectric membrane or crystal.

In an ideal case, the response of the detector-surface-detector system will be such that the amplitude and shape of the pulse will not depend on the location of the impact of the drop, i.e. the detector surface will be homogeneous. However, this is not essential, as an inhomogeneous response will only cause a random error in the measurement, which can be eliminated by using a sufficiently long integration time.

The calculation of the amount and intensity of precipitation can be implemented in several different ways. At its simplest, only the number of drops is calculated, but the accuracy and reliability of the sensor will improve if the information contained in the shape (e.g. amplitude or full width at half maximum) of the pulses is also exploited. In that case, it will be preferable to implement the calculation using digital signal processing and microprocessors.

Figure 2A:
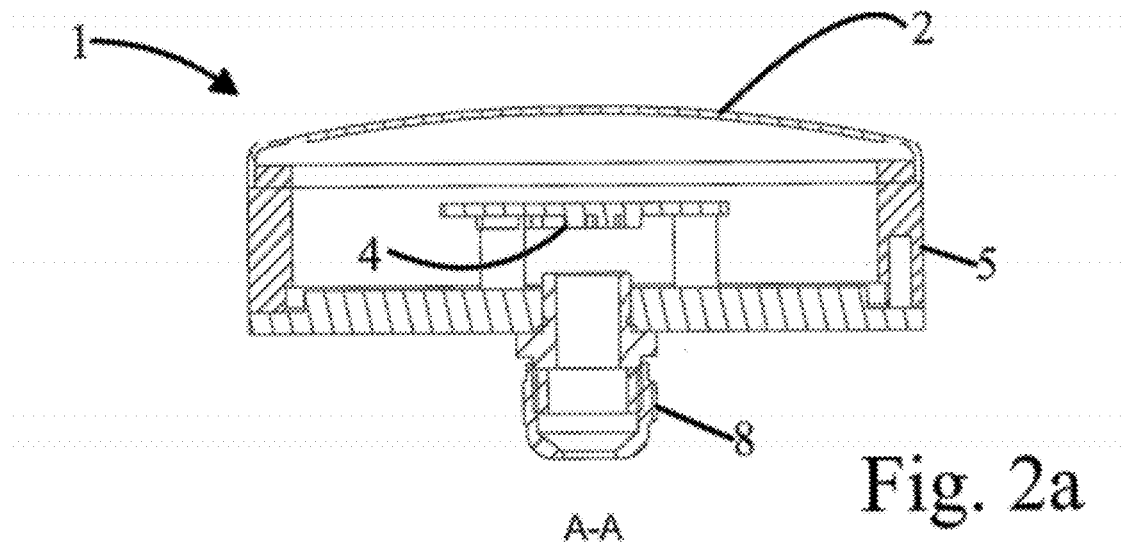
FIG. 2a shows a cross-sectional side view of another sensor according to the prior art.
Figure 2B:
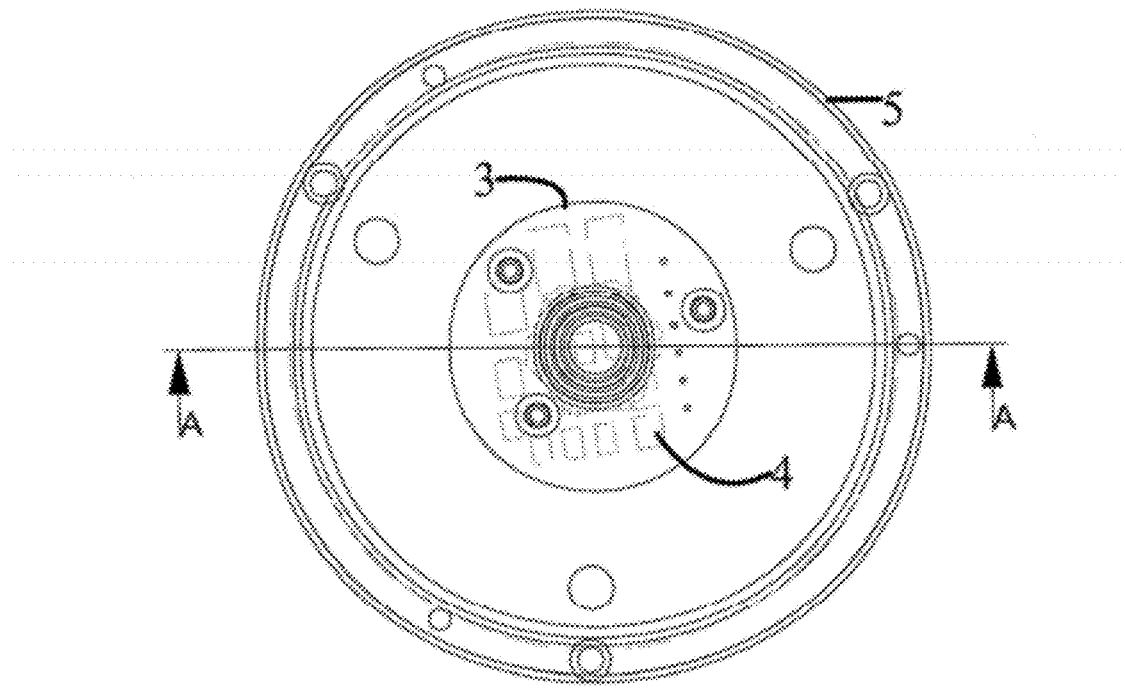

FIGS. 2a and 2b show an alternative implementation of the sensor 1 to that in FIG. 1. The sensor 1 is a cylindrical box, the cover 2 of which is a slightly convex metal disc, e.g., of 1-mm thick stainless steel, acting as the detector surface. The cover 2 is rigidly attached at its edges to the body 5 of the box and in the middle of it a ceramic piezo element 3 is attached to its underside by gluing or soldering. The piezo element is a disc made from a piezoelectric ceramic, which is metallized on both sides, to form two electrodes on opposite sides of the disc. In this embodiment, the piezo element 3 acts as a force sensor detecting impacts by drops.

The electrodes of the piezo element 3 are connected to an electronic amplifier 4, which is located inside the sensor box. The amplified measurement signal is taken by a cable running through the bottom 8 of the sensor box to the device performing the computation. Alternatively, all the measuring and computation electronics can be located inside the sensor box, in which case the output will be a digital or analog measurement message containing precipitation amount and/or intensity data.

Figure 3:
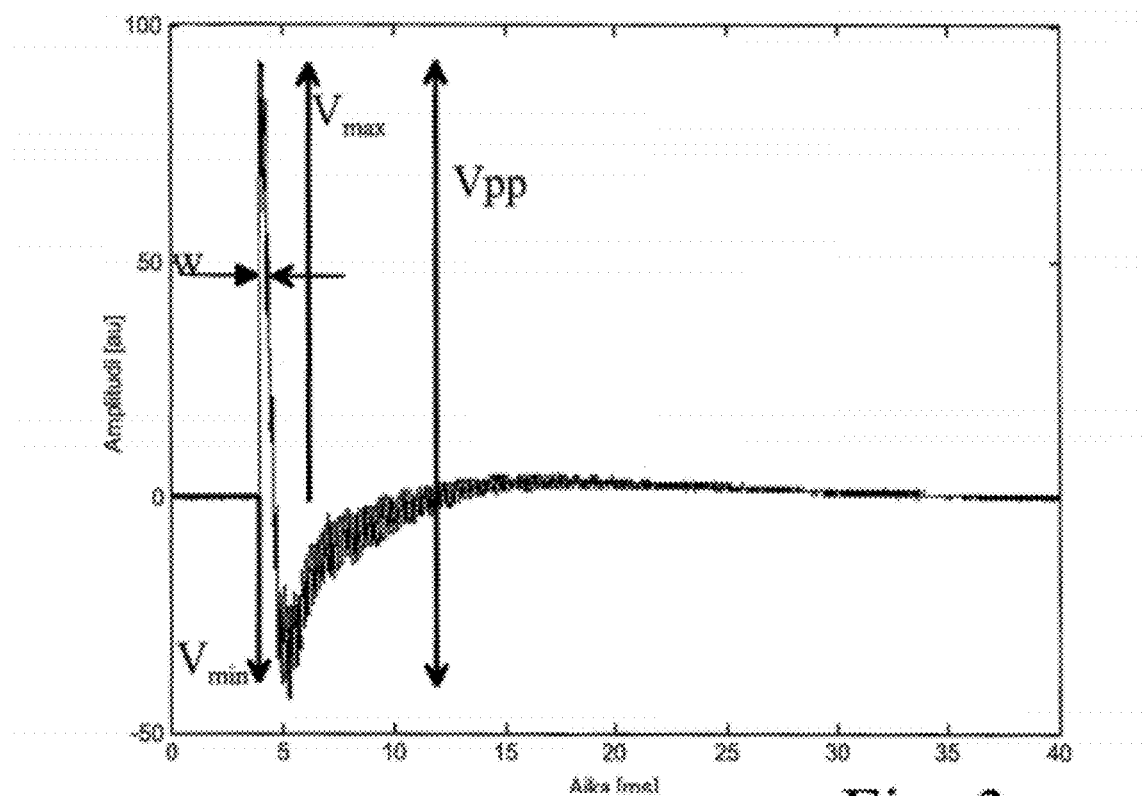
FIG. 3 shows graphically the impulse caused by a water drop in an apparatus according to the prior art.

When a precipitation drop strikes the detector surface 2, it directs a force onto it, which is transmitted on to the piezo element 3 and the voltage pulse arising over it is detected. The material and dimensions of the dome 2 are selected in such a way that the vibration caused by the water drop is quickly damped. The pulse shape will then be like that in FIG. 3.

The voltage pulses obtained from the piezo element 3 are filtered, amplified, and the desired parameters proportional to the drop size are measured and saved in the memory of the processor performing the computation.

The intensity and amount of precipitation can be calculated from the measurement data in several ways.

In the following, two possible methods are presented.

Method 1

The calculated is performed from a fixed time step, the length of which is typically 1-10 minutes. During the measurement period, the parameters $x_j$ (which can be the full width at half maximum ($w_{1/2}$), the peak-to-peak voltage ($V_{pp}$), the number of pulses, or some other parameter specific to the pulse, or a combination of these) are measured from the detected pulses and saved in the processor's memory. At the end of each period, an estimate is calculated of the amount of accumulated precipitation $\Delta P$, using the expression $$\Delta P = f(m, x_{ij}, \ldots, x_{1n}, x_{21}, \ldots, x_{2n}, \ldots x_{m1}, \ldots, x_{mn}) \quad (1)$$

in which
m=the number of drops detected during the measuring period
n=the number of parameters specific to the pulse used in the calculation
$x_{ij}$=the value of the parameter j of the pulse caused by a drop I. The values of j can be coded, for example, as follows: 1=full width at half maximum ($w_{1/2}$), 2=peak-to-peak voltage ($V_{pp}$), 3=number of pulses, 4=some other parameter specific to the pulse, 5=a combination of the above. The full width at half maximum $w_{1/2}$) refers to the width of the pulse at the centre point of a positive pulse ($=½*V_{max}$).

The function f depicts the experimentally determined dependence between the parameters measured and the amount of precipitation.

The cumulative amount of precipitation P is obtained by summing the precipitation amounts of consecutive measurement periods. The mean intensity of precipitation during the duration R of the measurement period can be calculated, if necessary, from the expression $$R = \Delta P/t \quad (2)$$

This method is particularly useful if it is desired to measure both the amount and the intensity of the precipitation simultaneously.

Method 2

Computation takes place in realtime, in such a way that it is initiated when the first precipitation drop is detected. The parameters $x_j$ of each drop detected are measured (according to FIG. 3, these can be the full width at half maximum $w_{1/2}$ the peak-to-peak voltage $V_{pp}$, the peak voltage $V_{max}$, the minimum voltage $V_{min}$, the number of pulses, or some other parameter specific to the pulse, or a combination of them) and the cumulative precipitation amount P is calculated as follows:

$$P = \Sigma_i [f(\Delta t_i, x_{i1}, \ldots, x_{in})] \quad (3)$$

in which the index i=1, 2, ... refers to the individual drops detected during the measurement, $\Delta t_i$ is the time between a detected drop and the drop preceding it, and the function f depicts the experimentally determined dependence between the measured parameters and the volume of the precipitation drops.

A pulse-based sensor is easy to implement using this method: always when the cumulative amount of precipitation has increased by one set step, one pulse is transmitted. The output of the sensor can then be a pulse output like that of tipping-bucket sensors, and thus it can be connected directly to the data-collection devices used in the more common meteorological stations.

The accuracy of the sensor and computation method described depends essentially on the accuracy of the calibration of the sensor. The calibration parameters, i.e. the constant terms included in the expressions (1) and (3) are determined by experiment by comparing the sensor to an accurate reference sensor in laboratory or real operating conditions, for example using regression analysis.

The detection of hailstones is important, for instance, at airfields. Previously known is a hailstone detector, which consists of a plate-like metal sheet and a microphone located under it. Hailstones are detected on the base of the sound they cause. A drawback with the detector is its sensitivity to interference noise, for which reason it is suitable mainly for use as a complementary sensor in optical measuring devices for the prevailing weather, as disclosed in U.S. Pat. No. 5,528,224.

In the following, a method is described, by means of which hailstones can be detected more reliably and the effect of interference noise can be reduced. The detection of hail can be added as an additional feature to the precipitation sensor described above, or a sensor intended solely for the detection of hailstones can be made.

Figure 4:
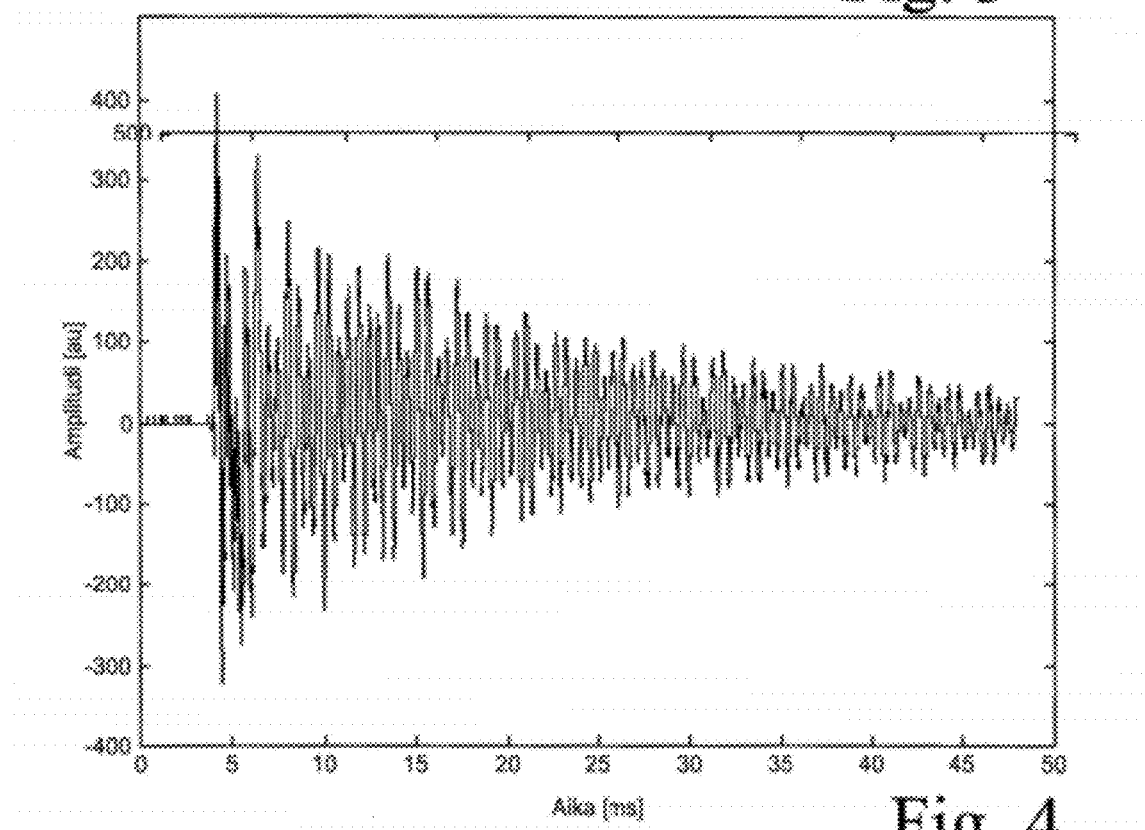
FIG. 4 shows graphically impulse caused by a hailstone in an apparatus according to the prior art.

The distinction between hailstones and raindrops is based on the signals caused by them being very different. The impact of a solid object, such as a hailstone, with the detector surface is elastic, so that, firstly, the rise time of the pulse is faster and secondly its amplitude is greater when compared to a pulse caused by a raindrop. The third difference is that the impact of a hailstone triggers the resonance frequencies of the dome 2 and the dome 2 remains vibrating after the impact. The differences can be seen clearly, if the pulse caused by a solid particle, shown in FIG. 4, is compared with the pulse of a raindrop in FIG. 3.

The precipitation sensor described above is not sensitive to interference noises travelling through air, as, unlike a microphone, the detector element is not in direct contact with the air.

Thus, the detection of a hailstone can be based on the detection of some characteristic feature—amplitude, rise time, or vibration frequency—or of some combination of them. If a combination of several features is used, the reliability of the measurement will increase and the erroneous detectors caused by interference noises will be minimized.

Wind is a significant source of errors in precipitation measurements, which are implemented using unprotected sensors. Errors of as much as 0-30% have been reported. The magnitude of the error depends on the wind speed, the precipitation intensity, and the precipitation type.

Various procedures for correcting errors due to wind have been presented. If precipitation and wind data are measured from the same area, the error, caused by wind, in the measured intensity of the precipitation can be reduced by using a suitable correction algorithm.

All the known systems used wind information, which has been measured in a location clearly different to that of the precipitation information. This is because wind information is typically measured at a height of a few metres above the surface of the ground, whereas precipitation measurement takes place typically essentially at the ground surface and at least several metres from the wind sensor. Thus, the wind information used in correction does not fully correspond to the real wind conditions at the precipitation measuring location. Present methods also do not operate in realtime, but instead the wind information is obtained in periods after the event, typically in monthly, weekly, daily, or 12-hour periods.

In the following, the method according to the prior art is described, which is based mainly on the following aspects:

- a wind-error correction algorithm is used, which utilizes wind data, which are measured directly from the location of the precipitation sensor, or at least in its immediate vicinity. In this connection, the term immediate vicinity means a distance of less than one metre from the precipitation sensor. The distance is preferably less than 30 cm, so that the anemometer can easily be integrated in the same measuring-device totality,
- the algorithm's time scale can be selected freely. Real-time correction is also possible,
- the algorithm is suitable for all types of precipitation sensor, irrespective of their operating principle.

The general form of the correction coefficient is $$k = R_{tr}/R = f(w,R) \qquad (4)$$

in which, Rtr is the real amount of precipitation, k is the correction coefficient, w the wind speed, R the measured amount of precipitation, and f is an experimentally determined function depicting the dependence of the correction coefficient on the wind speed and the intensity of the precipitation. The time scale of the correction is defined as the period of time used in the equation (4) to calculate the variables R and w.

The corrected amount of precipitation is obtained by multiplying the measured amount of precipitation by the coefficient k. The same correction procedure can be used for different types of sensor, though the form of the function f(w,R) will vary.

In practice, the dependence of the correction coefficient on the amount of precipitation R and the wind speed w, i.e. the function f(w,R) is determined experimentally using two similar precipitation sensors. One of these is protected as well as possible from the wind, so that its measurement result will represent the error-free amount of precipitation Rtr. Alternatively, a separate reference sensor protected from the wind can be used to measure Rtr. The other precipitation sensor is located to be subject to the wind and its measurement result R will include a wind error. A wind sensor, by means of which the wind speed W is measured, is located in the immediate vicinity of the latter precipitation sensor. The function f(w,R) in equation (4) can now be determined from experiential measurement information, for example using a non-linear regression method.

Figure 5:
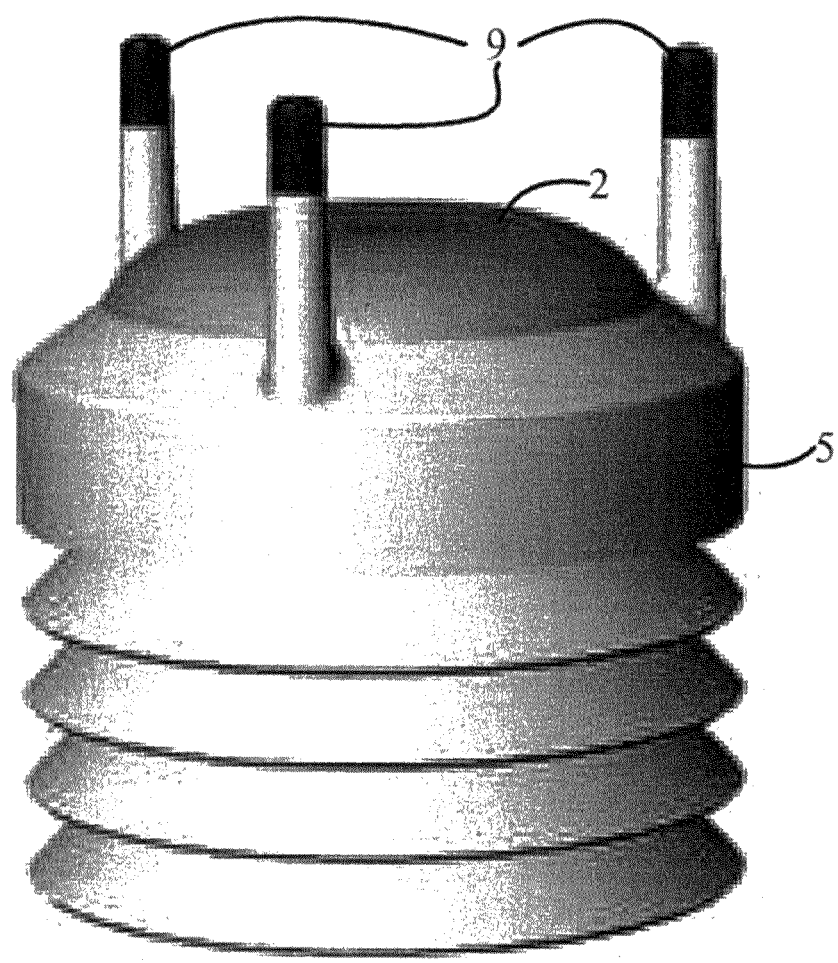
FIG. 5 shows a precipitation sensor equipped with a wind-speed measurement apparatus according to the prior art.

According to FIG. 5, a wind-measurement system based on ultrasound measurement is arranged around the measuring area. In the system, there are typically three ultrasound transceivers 9 and the direction and strength of the wind speed are determined on the basis of the times of travel between the ultrasound transceivers 9. This technique is disclosed in greater detail in, for instance, U.S. Pat. No. 5,343,744. Thus, in this new way, the wind can be measured in practice in the same area as the measurement of precipitation. In the known solutions, the precipitation sensor is located close to the surface of the ground, whereas the wind measurement takes place at a height of several metres and thus far from the precipitation measurement point. This embodiment of the invention is thus characterized by the wind and precipitation measurement areas being placed as close to each other as possible, in practice both variables being measured at essentially the same place. Instead of ultrasound measurement, other methods too can be used to measure the wind, for example, thermal methods, in which the temperature of elongated, essentially vertical elements is measured from different sides of them, when the part of the measurement elements on the side facing the wind will typically be the coolest.

In addition to the sensors shown in FIGS. 1-5 based on detecting the mechanical impulse of hydrometeors, the invention can also be applied in connection with optical measuring devices. In these optical measuring devices, the velocity and size of a hydrometeor is determined optically. An optical measuring device can also distinguish hydrometeors formed of snow and sleet, due to their lower velocity, which differs from that of raindrops and hailstones.

Figure 6:
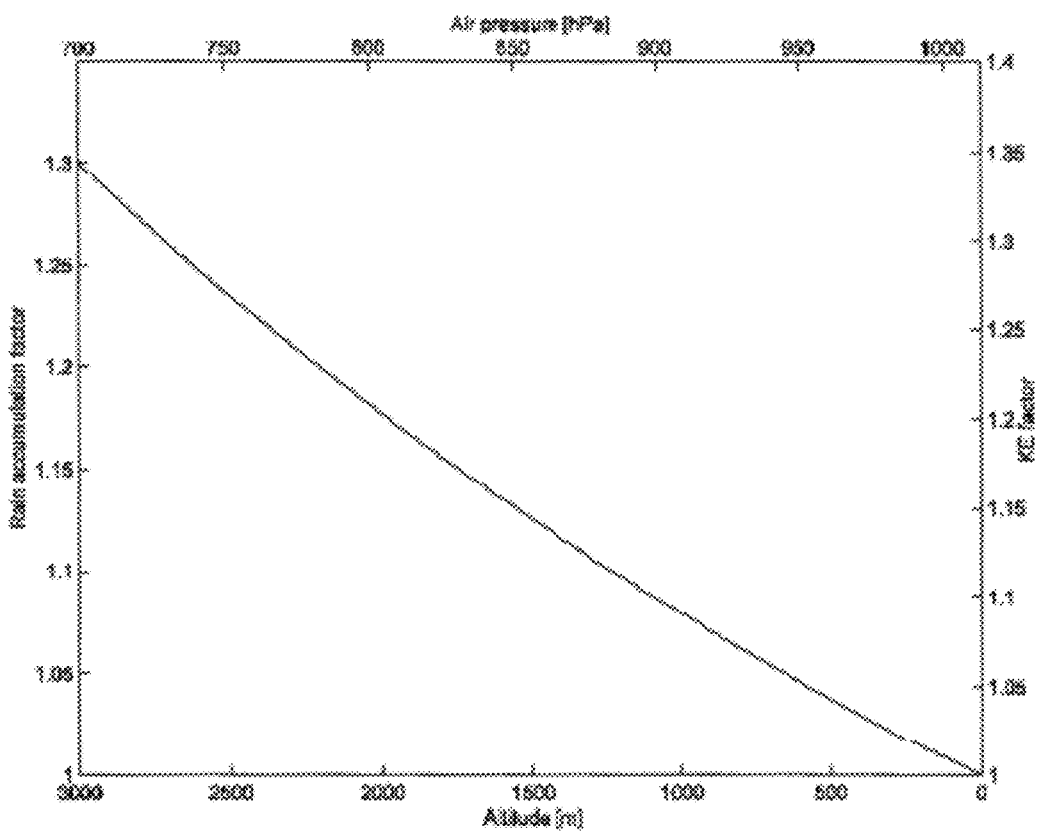
FIG. 6 shows graphically a correction curve according to the invention for correcting precipitation measurement as a function of pressure.

According to FIG. 6, it can be seen that the pressure and altitude data on the horizontal axis affect the precipitation collection function on the vertical axis. The graph is defined on the basis of observations according to the invention. As can be seen from the graph, the value of the precipitation collection function increases by 1.3 times, when rising from sea level to an altitude of 3000 m.

Figure 7:
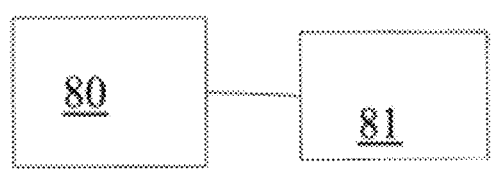
FIG. 7 shows a block diagram of one measuring device according to the invention.

FIG. 7 shows the connection of a hydrometeor measuring device 80 and an atmospheric-pressure measuring device 81. According to the invention, in a preferred embodiment, the precipitation measuring device 80 uses the atmospheric-pressure information of the atmospheric-pressure measuring device to correct the precipitation information.

According to FIG. 8. the correction coefficient is used as follows. Information on the amount of precipitation is collected from a precipitation sensor 90. The measuring algorithm 91 is used to form from the data of the sensor 90 a model of the total precipitation, the size of the drops, and their number in a unit of time. In block 92, this model is combined with pressure information 93, which is obtained either from the measuring device or as a value entered. The output 94 obtained is the measurement information corrected by the pressure information.

One example of the correction coefficient according to the invention as a function of pressure k(p), is presented in the following:

$$k(p)=1-6.8*10^{-4}(1013-p)-2.0*10^{-7}*(1013-p)^2$$

in which p=the barometric pressure [hPa].

Figure 8:
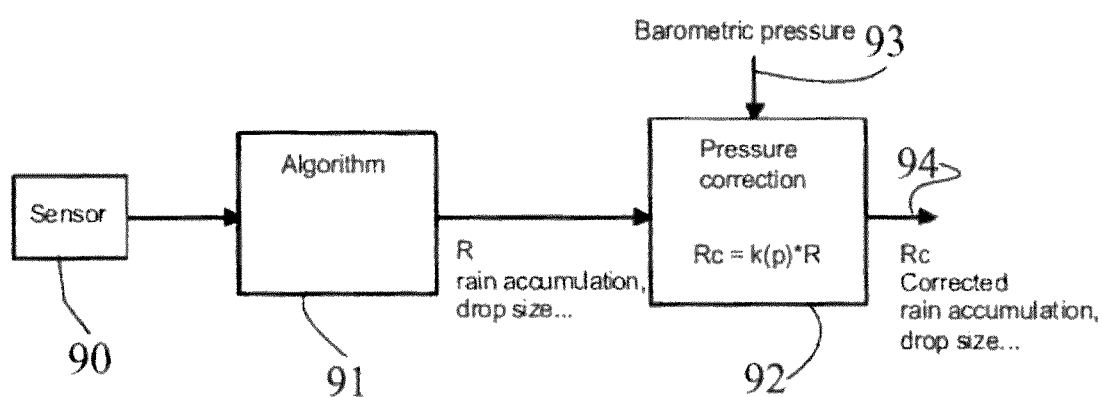
FIG. 8 shows a block diagram of the method according to the invention.

Thus, in the solution of FIG. 8, the elements 90, 91, and 92 are incorporated in the element 80 of FIG. 7 and correspondingly the pressure information 93 is obtained from element 81 of FIG. 7.

The invention is suitable for application in connection with the optical measuring devices and those based on the detection of an impact of a hydrometeor, already referred to above, as well as to radar-type solutions, in which precipitation is estimated with the aid of radio and/or microwaves. Thus, in the latter, electromagnetic radiation is directed to the precipitation and the amount of precipitation is determined on the radiation that is reflected or scattered back.

The invention claimed is:

1. A method in connection with a measuring device detecting hydrometeors, in which method
   the parameters of a precipitation are determined with the aid of a number and size of the hydrometeors,
   wherein
   the determining of the size of the hydrometeors is changed as a function of a prevailing atmospheric pressure, in such a way that the higher the atmospheric pressure, the larger a hydrometeor with the same speed will be estimated to be.

2. The method according to claim 1 in connection with a measuring device detecting hydrometeors, in which method
   the number and speed of the hydrometeors are measured either optically, acoustically, with the aid of at least one of radio and microwaves, or with the aid of the impulses they cause, in order to determine the size of the hydrometeors, and
   an amount of precipitation is determined with the aid of the number and size of the hydrometeors,
   wherein
   the determining of the size of the hydrometeors is changed as a function of the prevailing atmospheric pressure, in such a way that the higher the atmospheric pressure, the larger a hydrometeor with the same speed will estimated to be.

3. The method according to claim 1, wherein the atmospheric pressure is determined in real time with the hydrometeor measurement.

4. The method according to claim 1, wherein the atmospheric pressure is determined by entering an altitude data of the measuring location into the measuring device.

5. The method according to claim 2, wherein, in the measurement of the amount of precipitation, a correction coefficient k(p) is used as the correction coefficient as a function of pressure as follows:

$$k(p)=1-6.8*10^{-4}*(1013-p)-2.0*10^{-7}*(1013-p)^2,$$

in which p=the barometric pressure [hPa].

6. A measuring device detecting hydrometeors, which device comprises
   means for determining an amount of precipitation with the aid of a number and size of the hydrometeors,
   wherein
   the device comprises means for altering the determining of the size of the hydrometeors as a function of a prevailing atmospheric pressure, in such a way that the higher the atmospheric pressure, the larger a hydrometeor with the same speed will be estimated to be.

7. The measuring device, according to claim 5, detecting hydrometeors, which device comprises
   means for measuring the number and speed of hydrometeors either optically, acoustically, with the aid of at least one of radio and microwaves, or with the aid of the impulses they cause, in order to determine their size, and
   means for determining an amount of precipitation with the aid of the number and size of the hydrometeors,
   wherein
   the device comprises means for altering the determining of the size of the hydrometeors, in such a way that the higher the atmospheric pressure, the larger a hydrometeor with the same speed will be estimated to be.

8. The measuring device according to claim 6, wherein it comprises means for determining an atmospheric pressure in real time with the hydrometeor measurement.

9. The measuring device according to claim 6, wherein it comprises input and memory means, with the aid of which the atmospheric pressure at a measuring location can be entered.

* * * * *